Sept. 6, 1932.  H. T. TINDALL  1,876,179
APPARATUS FOR FRACTIONAL DISTILLATION OF COMPOSITE LIQUIDS
Filed May 23, 1930
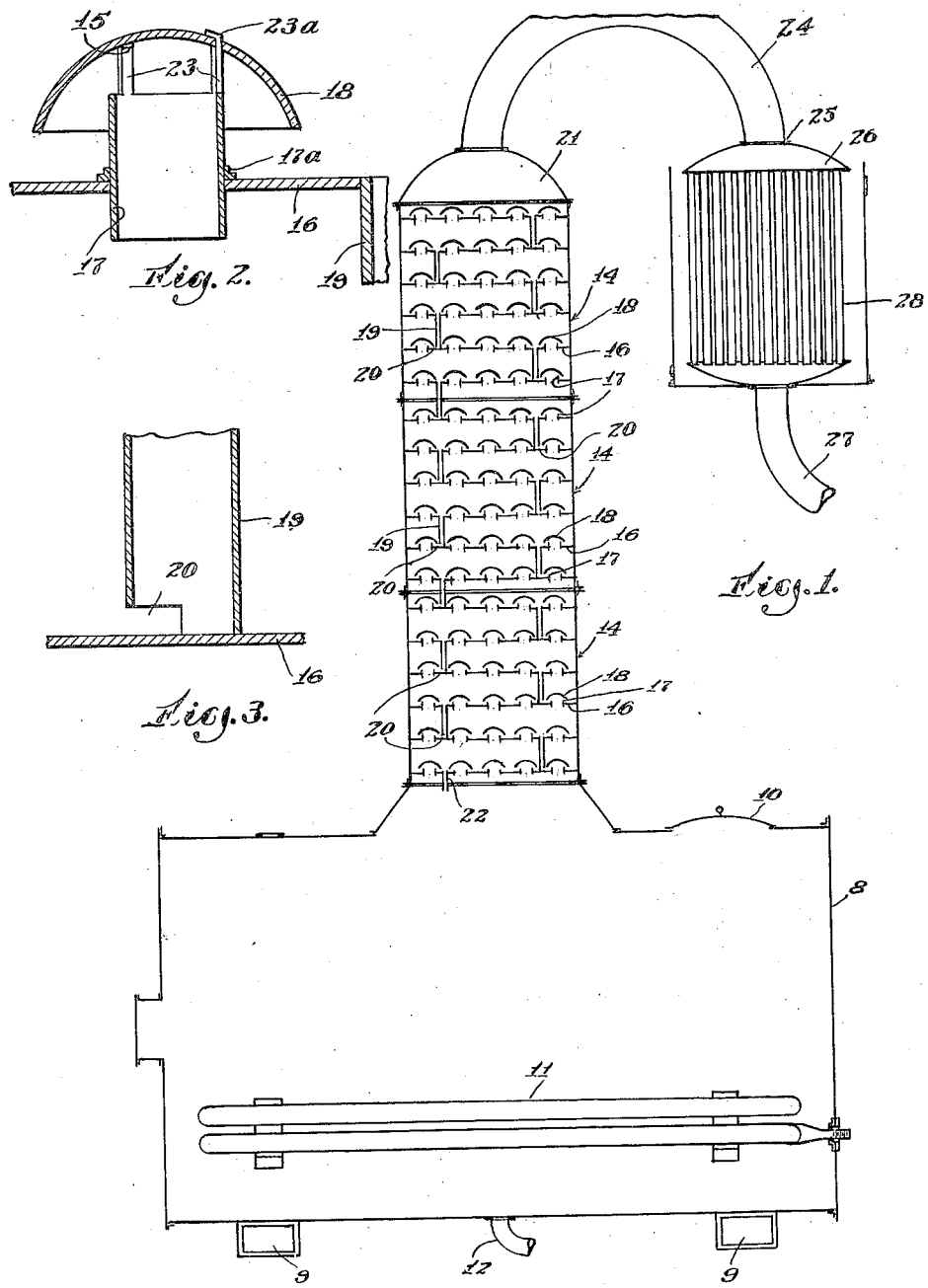
Inventor
Herbert T. Tindall
by Mitchell, Chadwick & Kent
Attorneys Patented Sept. 6, 1932

1,876,179

UNITED STATES PATENT OFFICE

HERBERT T. TINDALL, OF DORCHESTER, MASSACHUSETTS

APPARATUS FOR FRACTIONAL DISTILLATION OF COMPOSITE LIQUIDS

Application filed May 23, 1930. Serial No. 455,077.

This invention pertains to apparatus for fractional distillation of composite or mixed liquids.

More particularly it pertains to means for distilling composite liquids, examples of which are hydrocarbons, crude oils, coal tar products, and the like, wherein vapors of a number of constituent substances come off together notwithstanding that, in a strict sense, they have diverse boiling points.

In apparatus hitherto used the ultimate separation of such substances is not as perfect as can be desired.

It is an object of the invention to provide for a more effective separation of the constituent substances during the initial distillation. It is a further object to provide distillation apparatus which is simple in construction and operation, which will function better and more economically than the apparatus now available to industry, and which has the further advantages that characterize the invention herein disclosed.

Briefly stated, the invention consists in the providing of a series of self-draining chambers within the vapor column, within which the mixed vapor, as it moves away from the body of liquid in the still, is subjected to gradual slight loss of heat and consequent moderate condensation. Under these circumstances this condensation occurs most largely among those constituents of the vapor which are of the higher boiling grade. The vapors pass through a somewhat long course, during which this occurs progressively. Meanwhile, concurrent condensate is guided so that gravity returns it toward the still. In the form illustrated, the path provided for it leads back through the same chambers wherein the vapors are moving forward, but the vapors in these chambers are guided therethrough in such a way as to minimize their contact with all returning condensate which has been formed further along in the course.

Apparatus commonly used for fractional distillation consists essentially of a still, a vapor column and a condenser. It is in the second of these elements, the vapor column, that I provide the self-draining chambers. I employ these in distinction from the liquid-retaining chambers or trays hitherto used in which the vapors bubble through a layer of liquid in each chamber. It is one of the features of my invention that, by avoiding such contact of vapor with condensate, the vapor which has become partially purified of its higher boiling constituents avoids picking any such up again. On the contrary, as it goes on it continues to experience progressive slight loss of heat, a condition under which the tendency is for condensation to occur in greater measure of its higher boiling than of its lower boiling constituents. Such heat as is set free by this condensation helps hold up the temperature, which tends to retain the lower boiling constituents in vapor form. Thus the purification of the vapor of its higher boiling vapors is progressive. Also, by eliminating the succession of liquid bodies through which the vapors from the still must force their way, I eliminate the building up of pressure on the still, and make it possible both to operate the still at a lower temperature, and even to employ a vacuum for drawing off the vapors or for modifying the conditions in the still.

For illustrative purposes, a single embodiment of the invention is disclosed in the specification and shown in the accompanying drawing, but it is to be kept in mind that the invention is capable of expression in a great many forms and is not limited to the particular species herein described. It is intended that the patent shall cover, by suitable expression in the appended claims, whatever features of patentable novelty exist in the invention disclosed.

In the illustrative embodiment of my invention shown in the accompanying drawing:

Figure 1 is a diagrammatic elevation showing each of the several parts in their relations to the others;

Figure 2 is a detail cross-sectional elevation showing the co-action of the self-draining plates and the bell caps; and Figure 3 is a similar detail view showing a part of one of the pipe drains which communicate between successive chambers.

The still on which the vapor column is mounted is designated 8 in the accompanying drawing and it is shown as supported by the members 9. Access to the interior of the still is gained through the manhole 10. Within the still body are located heating elements 11, preferably steam coils, of which there may be any suitable number, for example, in some instances twenty-four.

A drain pipe 12 permits the drawing off of the undistilled residues.

The vapor column may conveniently be made of structural units or sections of which as many as desired may be employed, those shown in Figure 1 being each designated 14. Within each unit are the plates 16, extending transversely across the vapor column and dividing it into superimposed chambers.

These units 14 may have any desired kind and degree of enveloping insulation (not shown) if desired, in order to restrict the escape of heat by radiation approximately to a predetermined rate. Or, if the size, conditions and desired results are such as to make it suitable, they may be left without insulation, and a current of air may be blown past them, or any selected ones among them, so that the removal of heat from the exterior will be mildly accelerated.

Each plate 16 is perforated by a plurality of vapor transmitting sheet metal pipes 17. Mounted on pipes 17 in any suitable way, as by means of vertically extending struts 23, shown more particularly in Figure 2, are baffle plates in the form of bell caps 18. In the construction illustrated the tops of the struts 23 have shoulders 15 whence vertical extensions or tongues 23ª project through appropriate holes in the bell caps and are bent over on the outer surface of the bell caps to retain them in place on the said shoulders.

Extending between the successive plates 16 are the drain pipes 19, each of which reaches through from the top surface of a given plate 16 to the plate 16 immediately below it. At the lower end of each of the pipes 19, as shown in Figure 3, a portion 20 is cut away permitting contents of the pipe 19 to run out upon the particular plate on which the pipe rests. Only one drain pipe 19 is needed in the preferred species between adjacent chambers. The entrances to pipes 19 are flush with plates 16 and these pipes are preferably spot-welded to hold them rigidly in place.

In the case of the pipes 17, which communicate between successive chambers, a similar spot-welding process may be employed. By spot-welding the ring 17ª to the pipe 17 and the plate 16 at four places, more or less if desired, around its circumference, the whole will be held rigidly and will form a practically unitary structure.

In the form of the invention chosen for illustration the return path of condensate is through the very same chambers in which the vapors are simultaneously rising. This has the advantage of showing how existing stills, wherein the vapors bubble up through a pool on each plate, can be reconstructed in a simple manner so as to embody the invention, wherein the pools are eliminated and a liquid-free course provided for the vapors. In a new construction it may be found preferable to arrange what are here shown as disconnected interior liquid drainage pipes 19, as a continuous interior or exterior drain leading back down to the still, with entrance from the top of each plate.

In either construction the tops of each plate may be pitched a trifle toward the drain entrance, 19 or otherwise, or scored with grooves, to facilitate the flow toward the drain of any liquid that may be on top of the plate. These modifications are so readily understood that it is not deemed necessary to illustrate them in the drawing.

The number of sections 14, the number of plates 16 within each section, and the number of passageways and bell caps may be varied at option of the designer.

In operation, the vapors ascending from the still pass into the vapor column in the usual way. There, repeatedly blocked by plates 16, they form into small currents through openings 17 and impinge against the bell caps 18. Both plates and bell caps constitute baffles compelling the vapors to follow an exceedingly tortuous course during which they lose heat slowly to the metal, depending on the rate at which heat is lost by escape from the walls of the tower, and the rate at which heat is added to the vapors by the consequent condensation of part. Condensate cannot gather to any depth on any plate 16 because the pipe 19 immediately drains each plate to the one next below it and so ultimately through pipe 22 to the still.

It may be said to be a feature of the invention that self-draining baffles, whether they be in the form of plates and bell caps or their equivalent, prevent the ascending vapors from passing through the vapor column in anything like linear or sinuous fluid flow. Because of the sharp reversal of direction in passing out of the pipe 17 and under the edges of the bell cap 18, a turbulence of flow is introduced which is desirable in that it tends to throw all parts of each pipe stream of vapors against the metal of the cap or the plate. Such condensation as takes place comes about from the fact that the gases impinge against successive less hot baffles, and not by virtue of any contact between pools of condensate and the ascending vapors. In apparatus now in use, pools of condensate are commonly employed so deep that the vapors have to pass through them, but it will be noted that in the invention herein described no such pools are permitted to form. By dispensing with the pools of condensate, many of the advantages thereof are retained, but their chief disadvantages, including entrainment of the particles of liquid by the ascending vapors, or a re-vaporizing of any that has once been condensed, are completely obviated.

It will be obvious that the constituents which pass through the vapor column by the tortuous course above described, and eventually reach the condenser 28, will be most largely of the lowest boiling variety. In passing from the vapor column to the condenser, the vapors pass through the dome 21 and goose neck 24 which is joined at 25 to the header 26 of the condenser 28. Leading from the bottom of the condenser 28 is the passage 27 by means of which the liquefied low-boiling vapors may be removed.

As the operation proceeds and the low-boiling constituents are removed, the higher boiling constituents, previously returned to the still by the pipes 19, begin to pass through the system. This results from the fact that higher temperature is necessary to vaporize the residual liquors in the still 8 and that such higher temperature is communicated by the ascending vapors to the sections 14. As the vapor column thus heats up, higher boiling constituents are permitted to pass through. It is accordingly possible to withdraw from the condenser 28, a liquid which to a high degree consists exclusively of one particular fraction or component of the original liquid, that which is coming into the condenser at any particular moment being very purely of a particular grade. Other grades are obtained separately and with individual purity by taking that which reaches the condenser at earlier or later times.

I have found in practicing the invention by means of apparatus of the kind set forth that the above result is gained to an extent hitherto unattainable so far as I am aware. Also there is lower back pressure within the still, less heat is required, ease of passage of the low-boiling constituents from the still to the condenser, and possible operation of the apparatus under a vacuum. In large measure these result from the fact that the pressure built up by successive pools of condensate is entirely dispensed with, there being in the present invention nothing to introduce pressure other than the mere presence of the baffles.

I claim as my invention:

1. Apparatus for distilling a composite liquid comprising a still, a vapor column communicatingly connected with said still, a series of plates within said vapor column dividing the same into chambers, a multiplicity of bell caps on each such plate, and pipe means flush with the top of each such plate extending downward to a point adjacent the plate immediately below, whereby condensate is returned to the still without contacting to an unnecessary extent with vapors ascending from the still.

2. Apparatus for distilling a composite liquid comprising a still, a vapor column communicatingly connected with said still, a series of plates within said vapor column dividing the same into chambers, a multiplicity of bell caps on each such plate, and, for each plate, a passageway having an opening at the level of the plate and leading to the space above the next lower plate, permitting such condensate as has formed to pass at once from each such plate to the one immediately below it, whereby the building up of back pressure within the still is largely avoided.

Signed at Boston, Massachusetts, this twenty-first day of May, 1930.

HERBERT T. TINDALL.